A. H. ROIKJER.
FILM AND SHUTTER CONTROLLING DEVICE FOR CAMERAS.
APPLICATION FILED FEB. 12, 1919.
1,331,852.
Patented Feb. 24, 1920.
3 SHEETS—SHEET 2.
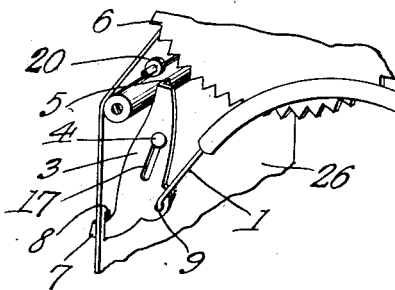
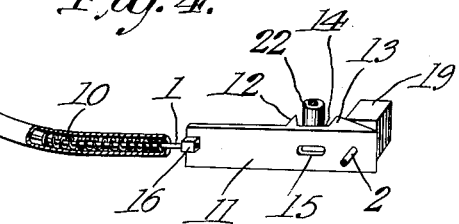
Fig. 4.
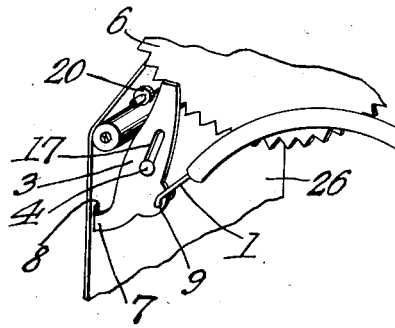
Fig. 5.
Fig. 6.
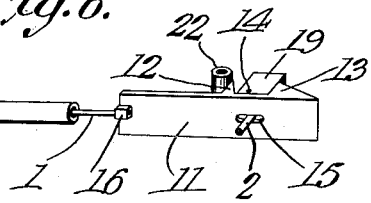
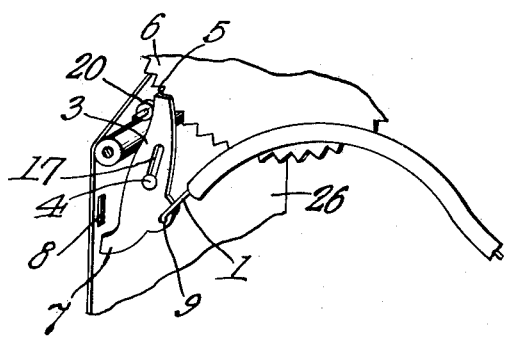
Fig. 7.
Inventor
Andrew H. Roikjer
By Jerry A Mathews
and Lester L Sargent
Attorneys A. H. ROIKJER.
FILM AND SHUTTER CONTROLLING DEVICE FOR CAMERAS.
APPLICATION FILED FEB. 12, 1919.
1,331,852.
Patented Feb. 24, 1920.
3 SHEETS—SHEET 3.
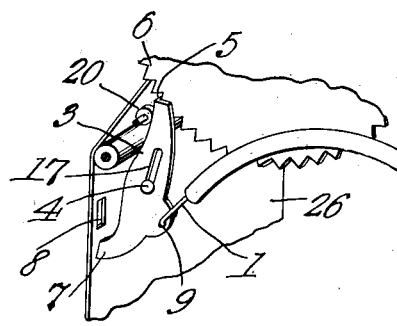
*Fig. 8.*
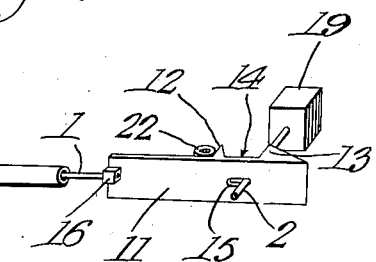
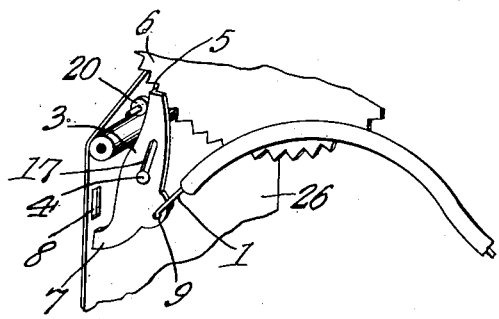
*Fig. 9.*
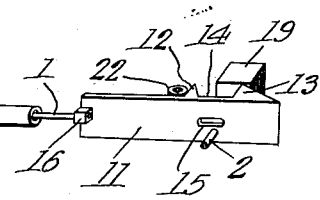
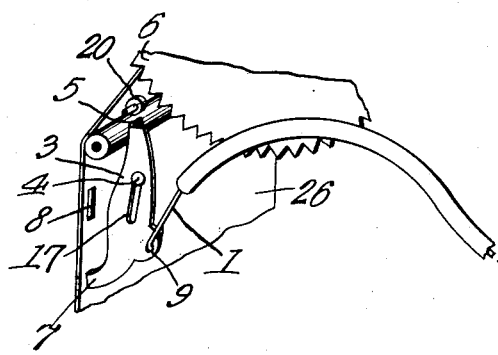
*Fig. 10.*
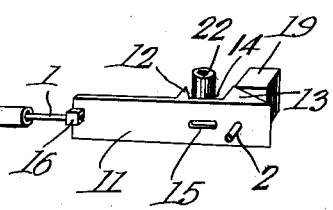
Inventor
Andrew H. Roikjer
By Jerry A Mathews
and Lester L Sargent
Attorneys.

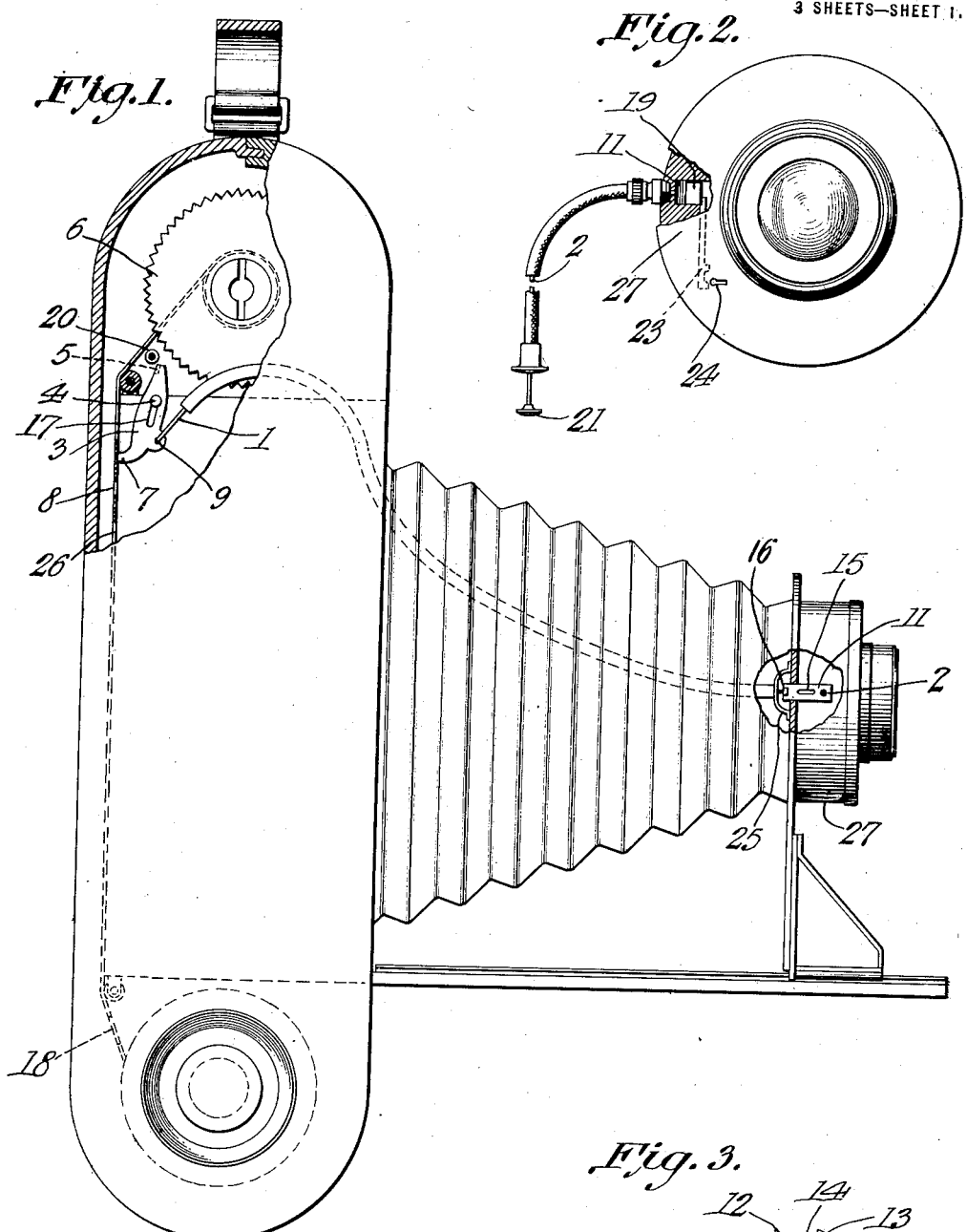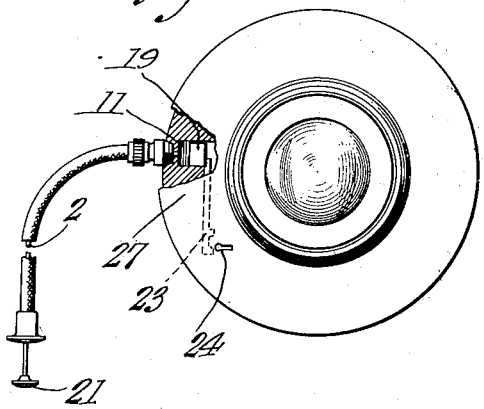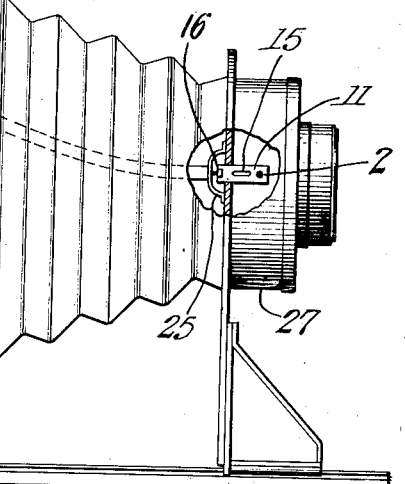

UNITED STATES PATENT OFFICE.

ANDREW H. ROIKJER, OF BOISE, IDAHO.

FILM AND SHUTTER CONTROLLING DEVICE FOR CAMERAS.

1,331,852.  Specification of Letters Patent.  Patented Feb. 24, 1920.

Application filed February 12, 1919. Serial No. 276,466.

*To all whom it may concern:*

Be it known that I, ANDREW H. ROIKJER, a citizen of the United States, residing at Boise, in the county of Ada and State of Idaho, have invented new and useful Film and Shutter Controlling Devices for Cameras, of which the following is a specification.

The object of my invention is to provide an improved device for controlling the film and also for controlling the shutter of a camera, to prevent the making of a double exposure or leaving a blank film; to provide novel means for protecting the mechanism against tampering; and to provide a relatively simple device capable of automatically controlling the apparatus to prevent the operation of the film and shutter when a double exposure or blank film would result; and to provide a device applicable to the ordinary film camera without radical changes in its construction or interference with its other mechanisms.

With these and other objects in view, as more fully hereinafter set forth, my invention is illustrated in the accompanying drawings, in which—

Figure 1 is a side elevation of a camera including my invention, portions of the camera being broken away to illustrate the device more clearly;

Fig. 2 is a front elevation, with portions broken away to show the arrangement of the shutter control and of the locking device 23;

Fig. 3 is a detail view, partly in elevation and partly in section of spring 10 and bolt 11;

Fig. 4 is a perspective, partly in section of the invention, showing dog 3 engaging the film, and bolt 11 in position to prevent operation of the shutter block 19;

Fig. 5 is a similar perspective, with the dog 3 released from engagement with film 26;

Fig. 6 is a similar perspective, with the ratchet wheel 6 of the film roll locked in nonrotatable position by tongue or projection 5 of dog 3, but with the shutter block in operative position;

Fig. 7 is a similar perspective, but with the sliding bolt locked by roller 22;

Fig. 8 is a similar perspective, but with the shutter block in its extreme position when operated;

Fig. 9 is a similar perspective, but with the sliding bolt 11 moved to a position to prevent a second operation of the shutter block until a new picture length of film has been wound to position; and Fig. 10 is a similar perspective, with the projection 5 released from engagement with ratchet wheel 6, permitting the winding of another picture length of film to position for exposure, the shutter block meanwhile being locked against operation.

Like characters of reference designate like parts.

Referring to the accompanying drawings, I provide a film 26 having suitably spaced openings or slots, such as 8 and 18, arranged one picture length apart. On the end of the film roll I provide a suitable ratchet wheel 6, and spaced from but close to it I provide a small roller 20. My principal film controlling element is the dog or pawl 3, having a projecting lower end 7 suitably shaped to engage in the slots, such as 8 and 18, in the film. Pawl 3 is provided with an elongated slot 17, and the pawl is mounted on the camera by the pin 4. The upper end of the pawl 3 is provided with a tongue or locking projection 5 adapted to engage between roller 20 and ratchet wheel 6 to prevent further rotation of the film spool to which ratchet wheel 6 is rigidly attached. Attached to pawl 3 at opening 9 is a flexible shaft 1, to the other end of which by means of a suitable connection or fastening 16 is attached the sliding bolt 11 which controls the operation of the shutter mechanism. Sliding bolt 11 is provided with a suitable preferably wedge-shaped stop 12, spaced apart from which is provided a suitable preferably wedge-shaped head 13, between which members is formed a channeled portion or cup 14. Longitudinally of the sliding bolt I provide a suitable slot 15 disposed at that portion of the bolt where cup 14 is positioned, for reasons hereinafter described. I further provide a suitable stop roller 22 adapted to engage the wedge shaped stop 12 to prevent movement of the sliding bolt 11 during the period that the device is in position to permit of the operation of the shutter.

Within shutter housing 27 I further provide a suitable locking bolt 23 positioned to be moved into or out of engagement with shutter block 19 to admit of or prevent the operation of that member and thereby to prevent operation of the camera by anyone not having a key to it. I provide a suitable key opening 24, for the admission of any suitable key of conventional form, for operating locking bolt 23. Sliding bolt 11 is mounted on shutter housing 27 by means of a suitable bracket 25, such as illustrated in Fig. 1.

The shutter is operated by a suitable block or shutter operating member 19, which member is actuated by the flexible shaft 2, which is operated by a suitable button 21.

Spring 10 serves to operate the flexible shaft 1 toward the film 26, when sliding bolt 11 is in position to permit such movement of shaft 1. Shaft 1 or the covering thereof may be mounted in any suitable manner to the camera casing.

In operation the flexible shaft is pressed in a direction toward the film by spring 10 thus normally pressing end 7 of pawl 3 into one of the slots in the edge of film 26, such as slot 8, which space the film into picture lengths. At the same time the sliding bolt 11 is also normally pulled toward the film, and to the position shown in Fig. 4 in which position the shutter can not be operated. In the position shown in Fig. 4 the pivot or pin 4 is in the upper part of the elongated slot 17 in pawl 3. As end 7 of pawl 3 engages a slot in the film as the film is wound and further winding of the film will push the pawl 3 upward, as it is enabled to do by reason of the provision of the elongated slot 17 through which pin 4 extends, and as pawl 3 reaches the position shown in Fig. 5 its tongue or projection 5 engages ratchet wheel 6, and as shown in Fig. 6 stops further movement of the ratchet wheel (and film roll attached to ratchet wheel 6) by the wedging of projection 5 between roller 20 and the ratchet teeth. At the same time sliding bolt 11 is moved away from the film, and into the position (shown in Fig. 6) in which shutter operating member or block 19 seats in cup 14 and shutter shaft 2 is in position to enter slot 15 and bear against block 19. As shown in Fig. 7, roller 22 engages stop 12 to prevent spring 10 from moving the sliding bolt 11 from the position illustrated until block 19 operating the shutter, has been in turn operated by flexible shaft 2, which is controlled manually by button 21, as will be understood by reference to Fig. 2.

After having wound film as shown in Fig. 5 the projection 5 is still a little distance from roller 20, but a little more winding causes its engagement with roller 20, as shown in Fig. 6 and the locking of the film roll by the pawl 3. The exposure is made when the device is in the position shown in Fig. 6. As indicated in the drawing, sliding bolt 11 swings toward or away from roller 22, which is a fixed roller and may be mounted in any suitable manner. Block 19 is normally pressed toward sliding bolt 11 by a spring (not shown and not claimed as my invention), whenever it is released by cable 2. The operation of the shutter cable 2 pushes shutter block 19 out of engagement with sliding bolt 11, as shown in Fig. 8. It is necessary to force shutter block 19 out of cup 14 by the operation of shutter shaft 2 to release head 13 from engagement with block 19. The movement of block 19 will proceed until the limit of movement of shutter shaft 2 is reached and roller 22 engages stop 12 of sliding bolt 11, as shown in Fig. 8. As bolt 11 is moved to the position shown in Fig. 9 it is in position to interpose head 13 to shutter block 19, thus causing the roller 22 to disengage itself from stop 12, and permit the sliding bolt 11, under the tension of spring 10 to be moved to the position shown in Fig. 10, its movement also being synchronous with the release of tongue 5 of pawl 3 from engagement with ratchet wheel 6, and permitting another picture length of film to be wound while the shutter is locked against operation during the winding of the film. A second or double exposure of film is thus prevented, as is also more than one operation of the shutter for a given picture length of film.

Attention is invited to the fact that my invention does not change the appearance of the camera; nor does it create extra friction either in the working of the shutter or the working of the film.

What I claim is:

1. A film and shutter controlling device for a camera, comprising, in combination with a camera adapted to receive a film having spaced slots in same to divide the film surface into picture lengths, film locking means adapted to engage in said slots and arranged to prevent continued winding of the film until an exposure has been made; and shutter controlling means operatively connected with the film locking means and arranged to prevent the operation of the shutter a second time until a new picture length of film has been moved to position for exposure.

2. In combination with the mechanism described in claim 1, shutter operating mechanism, and a manually controlled flexible shaft for operating the shutter mechanism.

3. In combination with the apparatus described in claim 1, manually controlled shutter actuating mechanism, and a locking bolt adapted to be locked in the path or withdrawn from the path of the shutter actuating mechanism, substantially as described.

4. In a film and shutter controlling device for a camera, the combination of a sliding pawl having one of its ends arranged to engage suitably spaced openings in the film at the end of each picture surface, means operatively connected with the film roll, with which a portion of the aforesaid pawl is adapted to engage to prevent further winding of the film, and shutter controlling means operatively connected with the pawl and arranged to prevent a second operation of the shutter mechanism until a new picture surface of film has been wound, substantially as described.

5. In a device of the class described, the combination of means for arresting the continued winding of a film while the shutter actuating means is in opposition for operation; shutter actuating means operatively connected with the aforesaid means for arresting the winding of the film, the above mentioned film arresting means and shutter actuating means being alternately locked and released, whereby one is always in locked position at the time the other is in unlocked position, for the purposes of preventing double exposure and blank films.

6. In a film and shutter control device, a sliding pawl having an elongated slot for mounting said pawl on a pivot pin, the pawl having a bent tongue at one end, and having an extended portion at its opposite end adapted to engage an opening in a film.

7. In a film and shutter control device, a sliding pawl, film roll arresting means with which a portion of the pawl is adapted to engage to arrest continued winding of the film, a flexible shaft attached to the pawl, a sliding bolt attached to the other end of the flexible shaft, a spring normally causing the flexible shaft to hold the pawl disengaged from the film arresting means, and shutter actuating means against which the sliding bolt is interposed when the above-described pawl is in position to admit of winding of the film, substantially as described.

8. In a film and shutter control device, a shutter control element comprising a sliding bolt having a head, a stop spaced from the head, and the sliding bolt having an elongated slot disposed longitudinally thereof in a position intermediate the aforesaid head and stop, for the admission of a shutter actuating shaft under predetermined conditions.

9. In a camera adapted to receive a film having slots successively spaced at the end of each successive picture surface, the combination of film-control means adapted to engage said slots, film arresting means with which the aforesaid film-control means is adapted to lock to arrest continued winding of the film, a resiliently controlled flexible shaft operatively connected to the film-control means, a shutter control member with which the other end of the flexible shaft is connected, and shutter actuating means arranged to operate the shutter when the film control means is locked in position to arrest the film, to prevent double exposure and the making of blank films, substantially as described.

10. In combination with the apparatus described in claim 9, means for locking the shutter control member in position to permit of the operation of the shutter actuating member when the film is in locked position.

ANDREW H. ROIKJER.